Nov. 25, 1952  R. W. RUSSELL  2,619,595
FLAME DETECTION APPARATUS
Filed Oct. 24, 1947
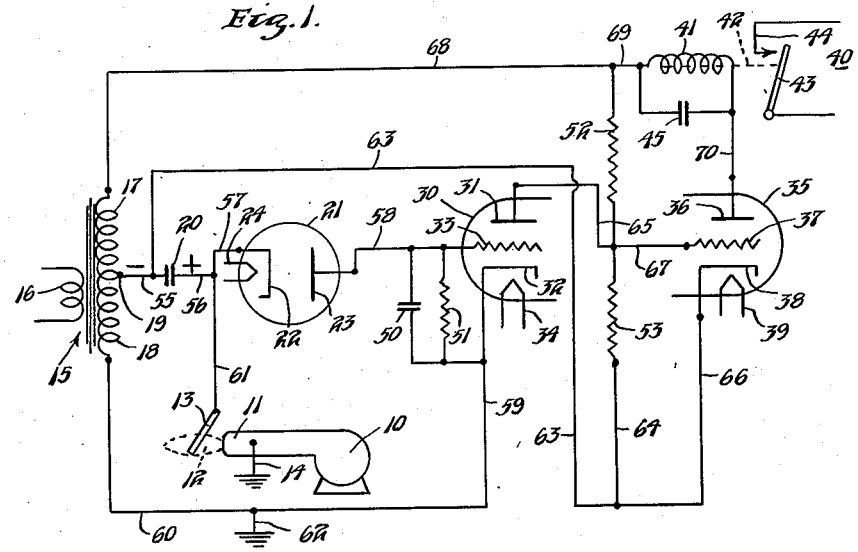
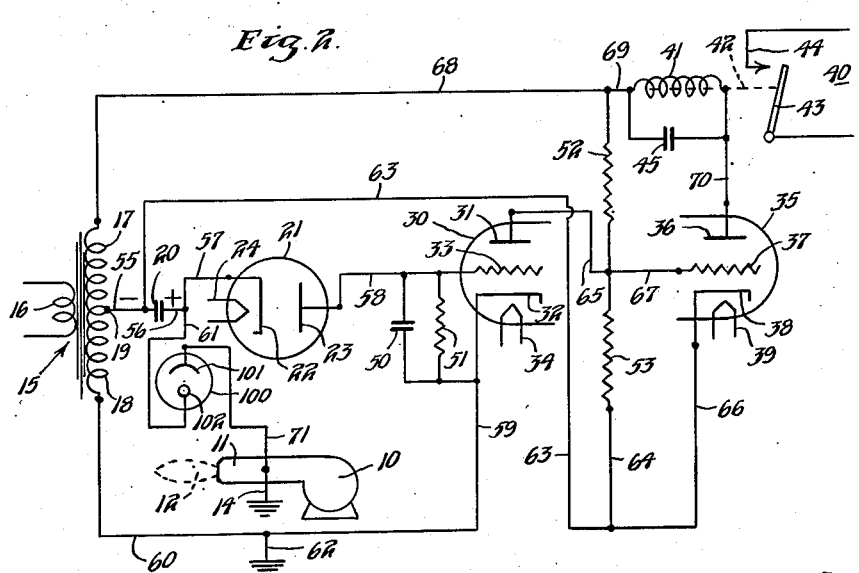
Inventor
ROBERT W. RUSSELL
By
George H. Fisher
Attorney Patented Nov. 25, 1952

2,619,595

UNITED STATES PATENT OFFICE 2,619,595

FLAME DETECTION APPARATUS

Robert W. Russell, Findlay, Ohio, assignor to Minneapolis-Honeywell Regulator Company, Minneapolis, Minn., a corporation of Delaware Application October 24, 1947, Serial No. 781,874

4 Claims. (Cl. 250—27)

The present invention is concerned with detection apparatus and particularly to that type of apparatus adapted for use in detecting the presence of a flame.

Many present day flame detection circuits rely upon the rectifying properties of a flame bridging a pair of flame electrodes. Where these electrodes are connected into an electrical circuit and there is a flame bridging the gap between the electrodes, there will be a resultant unidirectional current which is utilized in the input circuit of an appropriate type of amplifier. This amplifier is generally operable to amplify the rectified currents and to energize a relay connected in the amplifier output circuit. Exhaustive tests have revealed that under certain conditions, it is possible to have a flame bridging a pair of flame electrodes which does not form a rectifying impedance and may even form a rectifying impedance of a character opposite that generally assumed. When such conditions exist it is possible for an amplifier to not be rendered operative when it is so desired. My invention, therefore, utilizes only the conducting properties of a flame or flame detecting device to detect the presence of flame. It is therefore an object of the present invention to provide an improved flame detection apparatus of the type which does not depend upon the rectifying characteristics of a flame bridging a pair of flame electrodes but upon the conductivity of a flame bridging those electrodes.

A further object of the present invention is to provide an improved flame detection apparatus of the type wherein an electronic amplifier is biased into operation whenever a flame detection device passes electrical current on the presence of flame.

Still another object of the present invention is to provide a detection apparatus wherein a rectifier charges a condenser whose only discharge path is by way of the conductive properties of a detection device.

A still further object of the present invention is to provide an improved detection apparatus of the type having a pair of flame electrodes as a detecting device which will be rendered inoperative whenever the flame electrodes are shorted out by an impedance of less than a predetermined value.

A still further object of the present invention is to provide a detection apparatus wherein a rectifier charges a condenser whose only discharge path is by way of the conductive properties of the detection device and wherein a linear impedance connected in the charging circuit of the condenser serves to bias an electronic amplifier into or out of operation according to the presence or absence of charging currents flowing to the condenser.

Still another object of the present invention is to provide in combination with the aforementioned objects a detection apparatus wherein a photocell is interchangeable with a pair of flame electrodes.

These and other more detailed and specific objects will be disclosed in the course of the following specification, reference being had to the accompanying drawings, of which:

Figure 1 shows one form of my invention utilizing a pair of flame electrodes in the detecting portion of the apparatus, and;

Figure 2 shows a modification of my invention wherein a photocell is used as the detection device.

Referring to Figure 1, the numeral 10 represents an oil burner of any desired type. Emitting from a nozzle 11 is a flame 12 which is directed to intersect a flame electrode 13. When there is a flame 12 intersecting the electrode 13, it is possible to establish an electrically conductive path from the electrode 13 to the burner nozzle 11 through the flame 12. The burner nozzle 11 is grounded at 14.

Supplying energy for my detecting apparatus is a transformer 15 comprising a primary 16 connected to a suitable source of power and a secondary having two sections 17 and 18 and a centertap at 19. A condenser 20 is connected between the centertap 19 and an asymmetrically conductive device or rectifier 21, the latter of which consists of a cathode 22, an anode 23 and a cathode heater 24. Connected to the anode 23 of rectifier 21 is a triode 30 which consists of an anode 31, a cathode 32, a control grid 33 and a cathode heater 34. The output of the amplifier 30 is coupled to the input of a second amplifier 35 which consists of an anode 36, a control grid 37, a cathode 38 and a cathode heater 39. Amplifiers 30 and 35 may form the two halves of a single double triode amplifier tube. A relay 40 is located in the output circuit of a second amplifier stage and consists of a relay energizing winding 41, an armature 42, a switch arm 43 biased into open position by means not shown, and a contact 44. Shunting the relay winding 41 is a by-pass condenser 45 which serves to by-pass the alternating component of the output of amplifier 35. A condenser 50 connected in parallel with a resistor 51 serve as the input biasing circuit for the amplifier triode 30 while resistors 52 and 53 form the input biasing resistors for the amplifier 35.

Operation of Figure 1

In discussing the operation of the species in Figure 1 it will first be assumed that the oil burner 10 is not in operation and that the flame 12 is not emitting from the nozzle 11. With this, rectifier 21 is operative to charge the condenser 20 to the polarity shown on the diagram so that the right hand terminal of the condenser 20 is positive and the left hand terminal of the condenser is negative. This charging circuit may be traced from the centertap 19 through the conductor 55, condenser 20, conductors 56 and 57, cathode 22, anode 23, conductor 58, resistor 51, and conductors 59 and 60 back to the lower terminal of the secondary winding 18. Inasmuch as alternating current is applied to the last traced circuit it may be seen that current will flow only when the centertap 19 is negative with respect to the lower terminal of the secondary section 18. It may be seen that the condenser 20 will charge to a value that will be equal to the peak voltage on the secondary section 18 and that once it is so charged, there will be no further flow of charging current in the above traced circuit. This may readily be seen since the positive potential on the right end of the condenser 20 will be of such magnitude as to counterbalance the negative voltage on the cathode 22 when the alternating current of the power supply is phased so that the tap 19 is negative with respect to the lower terminal of the section 18. Obviously, no current will flow through the rectifier when the anode is not positive with respect to the cathode. The time it takes the condenser 40 to charge is not of any appreciable length and will not cause any perceptible operation in any other part of the apparatus.

With no charging current flowing through the resistor 51 there will be no biasing of the triode 30 and the grid 33 will be effectively at the same potential as cathode 32 since the resistor 51 is directly connected between the grid 33 and the cathode 32. During the conducting half cycles of the triode 30, that is when the anode 31 is positive with respect to the cathode 32, there will be current flow through the tube. The circuit for this current flow may be traced from the center tap 19 through conductor 63, conductor 64, resistor 53, conductor 65, anode 31, cathode 32 and conductors 59 and 60 back to the secondary section 18. With this current flowing, there will be a biasing of triode 35 which will keep this tube from passing sufficient current to energize relay 40. The biasing of triode 35 is accomplished by resistor 53, which is connected to the grid 37 by conductor 67 and to the cathode 38 by conductors 64 and 66. When there is current flowing through the anode circuit of triode 30, there will be a voltage drop across the resistor 53 such that the upper terminal of 53 is negative with respect to the lower terminal of the same resistor. Just how the voltage drop on resistor 53 results in biasing triode 35 may been seen when it is noted that the energizing voltage for the triode 35 is phased in the same way as the voltage on triode 30. The energizing circuit for triode 35 may be traced from the upper terminal of secondary section 17 through conductors 68 and 69, winding 41, conductor 70, anode 36, cathode 38, and conductors 66, 63 and 55 back to the tap 19. When there is a voltage drop in resistor 53 due to the current flowing in the energizing circuit of triode 30 the triode 35 will be biased below the range of current flow required for energizing relay 40.

As soon as the burner 10 is brought into operation, if functioning normally, there will be a flame 12 emitted from the nozzle 11 which will intersect the flame electrode 13. With the flame present, a conductive discharge path is established for the condenser 20 which may be traced from the right end of the condenser 20 through conductors 56 and 61, electrode 13, flame 12, nozzle 11, ground 14, ground 62, conductor 60, secondary section 18, tap 19, and conductor 55 back to the left hand terminal of the condenser 20. As the condenser 20 starts to discharge, the positive potential on the right hand terminal of the condenser will be less so that it will be possible for the rectifier 21 to conduct and attempt to maintain the condenser 20 in its charged condition. With the flow of charging current through the rectifier 21, there will also be a current flow through the resistor 51 which will put a biasing potential on the resistor 51 such that the lower terminal of the resistor will be positive and the upper terminal will be negative. The biasing potential on the resistor 51 will tend to bias the triode 30 to be non-conductive since the resistor 51 is directly connected between the grid 33 of the cathode 32. With the decreased current flow through the triode 30 there will be a decrease in the current flow through the resistor 53 since the resistor 53 is in the anode circuit of the triode 30. With less current flowing through resistor 53 there will be less biasing of the triode 35 so that now the triode 35 will be conductive sufficiently to energize the relay 40. With the energization of the relay 40, the armature 42 will move the switch blade 43 into engagement with contact 44 and will thus close an electrical circuit that may be utilized in any desired manner in the controlling of the operation of the oil burner motor 10 or to perform any switching function where it is desired to indicate the presence of flame 12.

In the event of a flame failure the flame 12 will no longer be intersecting the electrode 13 so that the discharging path for the condenser 20 will be interrupted. With this circuit interrupted, the rectifier 21 will charge condenser 20 once again to the peak value of the alternating current voltage existing on secondary section 18 and since the condenser cannot discharge there will be no further charging current flowing through the rectifier 21 or through the biasing resistor 51 so that now the grid 33 of triode 30 is again effectively connected to the cathode 32 and the triode 30 will be conducting an appreciable amount of current. Since the current flow through the triode 30 is increased, there is a subsequent increase in the current flow through resistor 53 which will bias the triode 35 to be nonconducting, or sufficiently low in current conductivity to deenergize the relay 40 so that the arm 43 will move out of engagement with switch contact 44.

Should a short circuit, or ground out, condition occur between the burner 11 and the flame electrode 13 the apparatus will not indicate the presence of flame. This may be seen since the ground out condition will by-pass the alternating current that normally flows from the center tap 19 through condenser 20, rectifier 21, resistor 51 and conductors 59 and 60 back to the secondary 18. This by-pass may be seen to be a direct connection from the right end of condenser 20 to the conductor 60. With no alternating current flow in the rectifier circuit, there will be no biasing of the triode 30 so that the grid 33 and cathode 32 will be at about the same potential so that triode 30 will be conducting and will bias triode 35 below the relay energizing point.

To prevent any sudden surge of current in the flame detection circuit from adversely affecting the operation of the amplifier, a transient by-pass or filter condenser 50 has been provided to by-pass the input to triode 30. This condenser, connected in parallel with resistor 51, effectively maintains a constant potential on control element 33 so that should there be a momentary appearance of flame 12 there will not be a pulling in of relay 40. Similarly, should the relay be energized by the presence of flame 12, the relay will not drop out when there is a flickering of the flame 12 unless the flame stayed off long enough for condenser 50 to discharge through resistor 51 and permit triode 30 to be conductive.

*Figure 2*

Figure 2 shows the invention used with a photocell substituted for the flame electrodes used in Figure 1. Components of Figure 2 that are identical to those of Figure 1 carry the same reference numerals.

Substituted for the flame electrode 13 of Figure 1 is the photocell 100 which consists of an anode 102 and cathode 101. This photocell is preferably of the variable resistor type whose conductivity is dependent upon the amount of light striking the cathode surface.

*Operation of Figure 2*

The operation of Figure 2 is almost identical to that of Figure 1 since the photocell 100 functions to pass current whenever light strikes the emitting cathode 101. The charging circuit for the condenser 20 in Figure 2 may be traced from the center tap 19 through condenser 20, conductor 56, rectifier 21, conductor 58, resistor 51, and conductor 59 and 60 back to the secondary section 18. When the burner 10 is not in operation and there is no flame 12 emitting from the nozzle 11 the condenser 20 will charge to the peak voltage of the secondary section 18 and once so charged there will be no charging current flowing through the rectifier 21 or the resistor 51. As soon as the burner is brought into operation, so that there is a flame 12 emitting from the nozzle 11, the photocell 100 will detect the flame and there will be an electron current flow from the cathode 101 to the anode 102 which will tend to discharge the condenser 20. The discharging current may be traced from the right hand terminal of the condenser 20 through conductor 61, anode 102, cathode 101, conductor 71, ground 14, ground 62, conductor 60, secondary section 18, center tap 19 and conductor 55 to the left hand terminal of the condenser 20. With the condenser 20 discharging through the photocell 100 the rectifier 21 will attempt to maintain the condenser 20 charged and as a result there will be a charging current flowing though the rectifier 21 and the biasing resistor 51. The functioning of this biasing current through resistor 51 is the same as was described in connection with Figure 1 and serves to bias the triode 30 to be nonconducting. With triode 30 nonconducting the triode 35 will be conducting so that the relay 40 will be energized to indicate the presence of flame 12 in any desired manner. Upon flame failure the photocell 100 will no longer pass current and the condenser 20 will not be able to discharge. As a result there will be no charging current flowing through the biasing resistor 51 so that triode 30 will now be conducting and triode 35 nonconducting so that relay 40 will be deenergized. Further, any short circuit condition on the photocell 100 will effectively by-pass the alternating current to the rectifier 21 so that there will be no biasing current flowing through resistor 51 to render triode 30 nonconducting in the same manner as when a short circuit existed in the circuit of Figure 1. Therefore a short circuit condition at photocell 100 will not result in a false indication of flame.

In one particular embodiment of my invention I found it desirable for condenser 20 to have a capacity of .002 microfarad. The condensers 45 and 50 were .5 microfarad and .02 microfarad respectively. The resistor 51 was chosen to have a resistance of 20 megohms while the resistors 52 and 53 had 100,000 ohms and 15,000 ohms resistance respectively. Each of the secondary sections 17 and 18 had a voltage of 300 volts. The amplifying triodes 30 and 35 were actually the triode sections of a twin triode tube known commercially as a 12SN7. The rectifier 21 was a single section of a twin triode tube of the type number 12SN7 wherein the grid was tied directly to the anode. The photocell used in the embodiment shown in Figure 2 was of the type known commercially as a 922.

From the foregoing description it can be seen that a flame detection apparatus has been provided which utilizes either a flame gap or a photocell to detect the presence of a flame and in utilizing these detecting devices, only the conductive properties of the detection devices are used to indicate the presence or absence of flame. Further I have provided an apparatus which does not indicate a flame falsely when the flame detector is grounded out.

While I have shown my invention in a flame detection apparatus and while it is particularly suitable for such an application, it is to be understood that it could be employed in any application wherein a detection device becomes conductive within a desired range on the presence of a condition. It is therefore to be understood that my invention is to be limited solely by the scope of the appended claims.

I claim:

1. Flame detection apparatus comprising in combination, a device including a circuit adapted to be connected to a pair of electrodes and to have an appreciable amount of current flow therethrough when the electrodes are bridged by a flame; a diode; a resistor; means connecting said diode and said resistor in series; means connecting said last named series connection in parallel with said device to form a paralell circuit; a condenser; an alternating source of power; means connecting said condenser, said source and said parallel circuit in a closed series circuit so that said diode and said source will charge said condenser to a predetermined potential and said device when exposed to a flame will discharge said condenser; an electron discharge device having an anode, cathode and control element; and means connecting said cathode and said control element directly across said resistor so that when said diode is charging said condenser and current is flowing through said resistor said discharge device will be operating in a first range indicative of the presence of flame and when said diode has charged said condenser and said device is not exposed to a flame and not discharging said condenser, or when said device is shorted by an impedance of less than a predetermined value, said discharge device will be operating in a second range indicative of the absence of flame.

2. Detecting apparatus comprising in combination, an electronic amplifier rendered operative or inoperative in accordance with the conductance of a condition responsive means, said amplifier having input and output terminals, a resistor, means connecting said resistor directly across the input terminals of said amplifier, and means for regulating the flow of current through said resistor to bias said amplifier in accordance with said current flow, said means comprising an asymmetrically conductive device, a condenser, an alternating source of power, means connecting said device, said resistor, said condenser and said source to comprise a series circuit so that said device will charge said condenser to a predetermined value, direct current conductive means connecting said condition responsive means in parallel with said resistor and said device to discharge said condenser and initiate the flow of charging current through said resistor when the conductance of said responsive means is within a predetermined range of conductivity.

3. Detecting apparatus comprising in combination, an alternating source of power, a condenser, a rectifier, means connecting said source, said condenser and said rectifier in a closed series circuit so that said rectifier is operative to charge said condenser, means connected to said condenser by a direct current connection for discharging said condenser on the presence of a condition, a resistor, means connecting said resistor in the charging circuit of said condenser, transient suppression means, means connecting said suppression means in parallel with said resistor to maintain the current flow through said resistor relatively constant should momentary fluctuations occur in the charging circuit of said condenser, an electron discharge device having an anode, cathode and control element, means connecting said cathode and said control element across the ends of said resistor so that said device will be operating in a first range when said rectifier is charging said condenser and in a second range when said resistor has no current flowing therethrough.

4. Flame detection apparatus adapted to be connected to a pair of spaced electrodes which have an appreciable amount of current flow therebetween when the electrodes are bridged by a flame, comprising in combination, a diode; a resistor; means connecting said diode and said resistor in series; means connecting said last named series connection in parallel with the pair of electrodes to form a parallel circuit; a condenser; an alternating source of power; means connecting said condenser, said source and said parallel circuit in a closed series circuit so that said diode and said source will charge said condenser to a predetermined potential and the current flowing between the electrodes when exposed to a flame will discharge said condenser; an electron discharge device having an anode, cathode and control element; and means connecting said cathode and said control element directly across said resistor so that when said diode is charging said condenser, and current is flowing through said resistor, said discharge device will be operating in a first range indicative of the presence of flame and when said diode has charged said condenser and the electrodes are not exposed to a flame and not discharging said condenser, or when the electrodes are shorted by an impedance of less than a predetermined value, said discharge device will be operating in a second range indicative of the absence of flame.

ROBERT W. RUSSELL.

REFERENCES CITED

The following references are of record in the file of this patent:

UNITED STATES PATENTS

| Number | Name | Date |
| --- | --- | --- |
| 2,112,736 | Cockrell | Mar. 29, 1938 |
| 2,127,977 | Lamb | Aug. 23, 1938 |
| 2,136,256 | Sweet | Nov. 8, 1938 |
| 2,299,501 | Schneider | Oct. 20, 1942 |
| 2,352,143 | Wills | June 20, 1944 |
| 2,379,871 | Beam et al. | July 10, 1945 |
| 2,413,020 | Wolfner | Dec. 24, 1946 |
| 2,422,574 | MacLoren et al. | June 17, 1947 |
| 2,455,351 | Beam | Dec. 7, 1948 |
| 2,476,496 | Kliever | July 19, 1949 |
| 2,478,373 | Dahline | Aug. 9, 1949 |